United States Patent
Hashimoto et al.

(10) Patent No.: US 10,073,425 B2
(45) Date of Patent: Sep. 11, 2018

(54) BROAD AREA MANAGEMENT SYSTEM, BROAD AREA MANAGEMENT APPARATUS, BUILDING MANAGEMENT APPARATUS, AND BROAD AREA MANAGEMENT METHOD

(71) Applicant: Hitachi Systems, Ltd., Shinagawa-ku, Tokyo (JP)

(72) Inventors: Kazuo Hashimoto, Yokohama (JP); Yuji Ogata, Saitama (JP); Fumio Enmei, Tokyo (JP); Minoru Kaneko, Yokohama (JP)

(73) Assignee: Hitachi Systems, Ltd., Tokyo (JP)

( * ) Notice: Subject to any disclaimer, the term of this patent is extended or adjusted under 35 U.S.C. 154(b) by 430 days.

(21) Appl. No.: 14/783,512

(22) PCT Filed: Sep. 3, 2013

(86) PCT No.: PCT/JP2013/073650
§ 371 (c)(1),
(2) Date: Oct. 9, 2015

(87) PCT Pub. No.: WO2014/167741
PCT Pub. Date: Oct. 16, 2014

(65) Prior Publication Data
US 2016/0062328 A1 Mar. 3, 2016

(30) Foreign Application Priority Data
Apr. 11, 2013 (JP) .................................. 2013-082578

(51) Int. Cl.
*G06F 19/00* (2018.01)
*G05B 15/02* (2006.01)
(Continued)

(52) U.S. Cl.
CPC ................ *G05B 15/02* (2013.01); *H02J 3/14* (2013.01); *H02J 13/0013* (2013.01);
(Continued)

(58) Field of Classification Search
CPC .. G05B 15/02; H04L 12/2816; H02J 13/0013; H02J 3/14; H04Q 9/00; H04Q 2209/60; Y04S 40/12; Y02B 90/2607
See application file for complete search history.

(56) References Cited

U.S. PATENT DOCUMENTS 8,918,221 B2 * 12/2014 Le Roux ................ G01D 4/004
700/22
9,614,373 B2 * 4/2017 Gow .......................... H02J 3/14
(Continued)

FOREIGN PATENT DOCUMENTS

EP 2 348 596 A1 7/2011
JP 4-10799 A 1/1992
(Continued)

OTHER PUBLICATIONS

International Search Report (PCT/ISA/220 and PCT/ISA/210) issued in PCT Application No. PCT/JP2013/073650 dated Nov. 19, 2013 with English translation (six pages).
(Continued)

*Primary Examiner* — Michael D Masinick
(74) *Attorney, Agent, or Firm* — Crowell & Moring LLP

(57) ABSTRACT

Even when there are a lot of buildings as a management target, a power consumption of each building can be appropriately managed. A broad area management system 10 is provided with a broad area management apparatus 20 in which a control command reception unit 22 receiving a selection of a control command of a power consumption from an operation terminal of an administrator and a transmission unit 24 transmitting received one control command
(Continued)

to a plurality of building management apparatuses 30 are included, and the building management apparatus 30 in which an event program execution unit 34 storing an event program in association with the control command, a reception unit 32 extracting the event program corresponding to the control command from the event program execution unit 34 in a case where the control command is received from the broad area management apparatus 20, an event program extraction unit 33 controlling the power consumption of each facility 15 by executing the extracted event program.

12 Claims, 17 Drawing Sheets

(51) Int. Cl.
*H04Q 9/00* (2006.01)
*H02J 3/14* (2006.01)
*H02J 13/00* (2006.01)
*H04L 12/28* (2006.01)

(52) U.S. Cl.
CPC .......... *H04L 12/2816* (2013.01); *H04Q 9/00* (2013.01); *H04Q 2209/60* (2013.01); *Y02B 90/2607* (2013.01); *Y04S 40/12* (2013.01)

(56) References Cited

U.S. PATENT DOCUMENTS

| | | |
|---|---|---|
| 2006/0125421 A1 | 6/2006 | Costa |
| 2007/0043478 A1* | 2/2007 | Ehlers ..................... F24F 11/30 700/276 |
| 2011/0184574 A1* | 7/2011 | Le Roux ................ G01D 4/004 700/291 |
| 2013/0066482 A1 | 3/2013 | Li et al. |
| 2015/0120075 A1* | 4/2015 | Le Roux ................ G01D 4/004 700/296 |

FOREIGN PATENT DOCUMENTS

| | | |
|---|---|---|
| JP | 2002-209335 A | 7/2002 |
| JP | 2002-345177 A | 11/2002 |
| JP | 2011-244511 | 12/2011 |
| JP | 2012-39856 A | 2/2012 |
| JP | 2012-53549 A | 3/2012 |
| WO | WO 2013/042520 A1 | 3/2013 |

OTHER PUBLICATIONS

Japanese-language Written Opinion (PCT/ISA/237) issued in PCT Application No. PCT/JP2013/073650 dated Nov. 19, 2013 (four pages).
European Search Report issued in counterpart European Application No. 13881466.0 dated Jan. 20, 2017 (seven pages).
Decision to Grant a Patent of JP 2015-511069 with English-language translation.

* cited by examiner

FIG. 4

PROGRAM TABLE 250

| PROGRAM ID (251) | EVENT PROGRAM BODY (252) |
|---|---|
| P001 | * * * * * |
| P002 | * * * * * |
| P003 | * * * * * |
| ⋮ | ⋮ |

FIG. 6

BUILDING 1 (B001)

| COMMAND ID | CONTENT | PROGRAM ID | ILLUMINATION CONTROL | | ... | AIR CONDITIONER CONTROL | | ... |
| --- | --- | --- | --- | --- | --- | --- | --- | --- |
| | | | ILLUMINATION 1 | ILLUMINATION 2 | | AIR CONDITIONER 1 | AIR CONDITIONER 2 | |
| C002 | 10% POWER SAVING | P001 | N/A | N/A | ... | CHANGE SETTING TEMPERATURE BY 2°C | CHANGE SETTING TEMPERATURE BY 2°C | ... |
| C003 | 20% POWER SAVING | P002 | OPEN BLINDER | N/A | ... | CHANGE SETTING TEMPERATURE BY 4°C | CHANGE SETTING TEMPERATURE BY 4°C | ... |
| ... | ... | ... | ... | ... | ... | ... | ... | ... |
| C009 | 80% POWER SAVING | P008 | ILLUMINANCE 20% | OFF WHEN ROOM IS NOT USED | ... | OFF | OFF WHEN ROOM IS NOT USED | ... |
| ... | ... | ... | ... | ... | ... | ... | ... | ... |

BUILDING 2 (B002)

| COMMAND ID | CONTENT | PROGRAM ID | ILLUMINATION CONTROL | | ... | AIR CONDITIONER CONTROL | | ... | ELEVATOR CONTROL | | ... |
| --- | --- | --- | --- | --- | --- | --- | --- | --- | --- | --- | --- |
| | | | ILLUMINATION 1 | ILLUMINATION 2 | | AIR CONDITIONER 1 | AIR CONDITIONER 2 | | ELEVATOR 1 | ELEVATOR 2 | |
| C002 | 10% POWER SAVING | P101 | N/A | N/A | ... | CHANGE SETTING TEMPERATURE BY 2°C | CHANGE SETTING TEMPERATURE BY 2°C | ... | OPERATION | OPERATION | ... |
| C003 | 20% POWER SAVING | P102 | OPEN BLINDER | OPEN BLINDER | ... | CHANGE SETTING TEMPERATURE BY 2°C | CHANGE SETTING TEMPERATURE BY 2°C | ... | STOP | OPERATION | ... |
| ... | ... | ... | ... | ... | ... | ... | ... | ... | ... | ... | ... |
| C009 | 80% POWER SAVING | P108 | ILLUMINANCE 20% | OFF WHEN ROOM IS NOT USED | ... | OFF WHEN ROOM IS NOT USED | OFF WHEN ROOM IS NOT USED | ... | STOP | OPERATION | ... |
| ... | ... | ... | ... | ... | ... | ... | ... | ... | ... | ... | ... |

FIG. 11

POWER INFORMATION STORAGE UNIT 26

260 ↙

B001 \ B002 \ B003 \ ···

261 ↘

| | 0:00-1:00 | 1:00-2:00 | ··· | 13:00-14:00 | ··· | 23:00-0:00 |
|---|---|---|---|---|---|---|
| ⋮ | ⋮ | ⋮ | ⋮ | ⋮ | ⋮ | ⋮ |
| 2013/2/4(MON) | 0.5kW | 0.4kW | ··· | 12kW | ··· | 0.6kW |
| 2013/2/5(TUE) | 0.6kW | 0.5kW | ··· | 11kW | ··· | 0.7kW |
| 2013/2/6(WED) | 0.5kW | 0.4kW | ··· | 15kW | ··· | 0.5kW |
| 2013/2/7(THU) | 0.5kW | 0.4kW | ··· | 9kW | ··· | 0.6kW |
| 2013/2/8(FRI) | 0.5kW | 0.4kW | ··· | 12kW | ··· | 0.5kW |
| 2013/2/9(SAT) | 0.5kW | 0.4kW | ··· | 7kW | ··· | 0.6kW |
| 2013/2/10(SUN) | 0.5kW | 0.4kW | ··· | 7kW | ··· | 0.6kW |
| 2013/2/11(MON) | 0.5kW | 0.4kW | ··· | 12kW | ··· | — |

| DATE | TOTAL POWER CONSUMPTION OF 13:00-14:00 | EXTRACTION OF VALUE | |
|---|---|---|---|
| 2013/2/4(MON) | 120kW | pow[0] | |
| 2013/2/5(TUE) | 110kW | pow[1] | |
| 2013/2/6(WED) | 150kW | NOT USED | ∴MAXIMUM VALUE |
| 2013/2/7(THU) | 90kW | pow[2] | |
| 2013/2/8(FRI) | 120kW | pow[3] | |
| 2013/2/9(SAT) | 70kW | NOT USED | ∴HOLIDAY |
| 2013/2/10(SUN) | 70kW | NOT USED | ∴HOLIDAY |
| 2013/2/11(MON) | 120kW | pow_now | | pow_now=120kW pow_avr=(pow[0]+pow[1]+pow[2]+pow[3])/4=110kW (pow_now−pow_avr)/pow_now=(120−110)/120≒0.1

→10% POWER SAVING

FIG. 17

| COMMAND ID | CONTENT | BUILDING 1 | | BUILDING 2 | | BUILDING 3 | | ... |
| --- | --- | --- | --- | --- | --- | --- | --- | --- |
| | | PROGRAM ID | CONTENT | PROGRAM ID | CONTENT | PROGRAM ID | CONTENT | |
| C101 | 10% POWER SAVING | P201 | 15% POWER SAVING | P301 | 7% POWER SAVING | P401 | 10% POWER SAVING | ... |
| C102 | 10% POWER SAVING | P202 | 13% POWER SAVING | P302 | 9% POWER SAVING | P402 | 11% POWER SAVING | ... |
| C103 | 10% POWER SAVING | P202 | 13% POWER SAVING | P303 | 10% POWER SAVING | P401 | 10% POWER SAVING | ... |
| ... | ... | ... | ... | ... | ... | ... | ... | ... |

US 10,073,425 B2

BROAD AREA MANAGEMENT SYSTEM, BROAD AREA MANAGEMENT APPARATUS, BUILDING MANAGEMENT APPARATUS, AND BROAD AREA MANAGEMENT METHOD

TECHNICAL FIELD

The present invention relates to a broad area management system, a broad area management apparatus, a building management apparatus, and a broad area management method. This application claims the benefit of priority to Japanese Patent Application No. 2013-82578, filed on Apr. 11, 2013, the entire contents of which are incorporated herein by reference, for the specified designated countries where recognizing incorporation by reference of documents by reference is approved.

BACKGROUND ART

Conventionally, in a building such as a hospital, a school, or a factory, there is a management apparatus for the management of facilities. In addition, there is a system which monitors information of the facilities in a plurality of buildings at a remote place through a communication network.

In this way, there is disclosed a technology in which data between the buildings scattered in a broad area is compared with ease and in real time by a high-speed and broad-banded communication network and automatic control is performed by interlocking the facilities in the plurality of buildings (for example, see Patent Literature 1).

CITATION LIST

Patent Literature

Patent Literature 1: JP 2012-53549 A

SUMMARY OF INVENTION

Technical Problem

A broad area management apparatus of Patent Literature 1 can output commands from an event program selection unit to the plurality of buildings. However, when the number of buildings of the management target is increased, the number of event programs is also increased to create the command for each building. Therefore, it is difficult to manage the event programs. For example, a power consumption of each building may be necessarily controlled at an interval of a short time such as 1 hour. In such a case where the broad area management apparatus of Patent Literature 1 intensively manages the power consumption of the plurality of buildings, the command is individually created for each building whenever the number of buildings of the management target is increased, which may be difficult in time.

The present invention has been made in view of the above circumstances, and an object thereof is to appropriately manage the power consumption of each building even in a case where the number of buildings of the management target is increased.

Solution to Problem

According to a first aspect of the present invention to solve the above problems, for example, a broad area management system which manages power consumed in a plurality of buildings includes: a broad area management apparatus; and a building management apparatus configured to be provided according to each building, and the broad area management apparatus includes a reception unit configured to receive a selection of a control command of power consumption from an operation terminal of an administrator, and a control command transmission unit configured to transmit the control command received by the reception unit to each of a plurality of the building management apparatuses, and the building management apparatus includes an event program storage unit configured to store an event program in association with the control command, the event program containing a control content to be performed on each facility in the building corresponding to the building management apparatus in order to realize the control command, an event program extraction unit configured to extract the event program corresponding to the control command from the event program storage unit in a case where the control command is received from the broad area management apparatus, and an event program execution unit configured to control power consumption of each facility by performing the extracted event program.

In addition, in the broad area management system, the building management apparatus may further include a power information transmission unit configured to frequently gather power information containing the power consumption of each facility in the building corresponding to the building management apparatus and transmit the power information to the broad area management apparatus. The broad area management apparatus may further include a first power information storage unit configured to store the power information of each facility in the building in association with the building, a power information receiving unit configured to receive the power information from the building management apparatus and to store the power information in the first power information storage unit, and a first control command generation unit configured to generate the control command by performing statistical processing on the power information stored in the first power information storage unit and cause the control command transmission unit to transmit the generated control command. The first control command generation unit may generate the control command based on the power information stored in the first power information storage unit in a case where a first time elapses after the reception unit receives the selection of the control command or after the control command is lastly generated based on the power information stored in the first power information storage unit.

In addition, in the broad area management system, the first control command generation unit may sum up the power consumptions of the facilities in each building and further sum up the power consumptions with respect to a plurality of buildings at each timing except the last timing with reference to the power information stored in the first power information storage unit, calculate an average value by averaging the total sums in a period until a predetermined time ago, sum up the power consumptions of the facilities in each building and further sum up the power consumptions with respect to the plurality of buildings at the last timing, and generate the control command according to a difference value obtained by subtracting the average value from the calculated total sum at the last timing.

In addition, in the broad area management system, the building management apparatus may further include a second power information storage unit configured to store power information containing the power consumption of each facility in association with the subject facility in the building corresponding to the building management apparatus, a power information gathering unit configured to frequently gather the power information from each facility in the building corresponding to the building management apparatus and store the power information in the second power information storage unit, and a second control command generation unit configured to generate the control command by performing statistical processing on the power information stored in the second power information storage unit and cause the event program extraction unit to extract the corresponding event program. The second control command generation unit may generate the control command by performing the statistical processing on the power information stored in the second power information storage unit in a case where a second time elapses after the control command is lastly received from the broad area management apparatus or after the control command is lastly generated based on the power information stored in the second power information storage unit.

In addition, in the broad area management system, the second control command generation unit may calculate an average value by averaging total sums in a period until a predetermined time ago, the total sums being the power consumptions of facilities at each timing except the last timing, with reference to the power information stored in the second power information storage unit, and generate the control command according to a difference value obtained by subtracting the average value from the total sum of the power consumptions of the facilities at the last timing.

In addition, according to a second aspect of the present invention, for example, there is provided a broad area management apparatus which manages power consumed in a plurality of buildings. The broad area management apparatus is provided with a reception unit configured to receive a selection of a control command of power consumption from an operation terminal of an administrator, and a control command transmission unit configured to transmit the control command received by the reception unit to each of a plurality of building management apparatuses which controls an operation of a facility in each building.

In addition, according to a third aspect of the present invention, for example, there is provided a building management apparatus which controls power consumed in a building. The building management apparatus is provided with an event program storage unit configured to store an event program in association with a control command indicating a reduction of power consumption in which the event program contains a control content to be performed on each facility in the building corresponding to the building management apparatus in order to realize the control command, an event program extraction unit configured to extract the event program corresponding to the control command from the event program storage unit in a case where the control command is received from a broad area management apparatus which transmits the same control command to a plurality of the building management apparatuses, and an event program execution unit configured to control power consumption of each facility by performing the extracted event program.

In addition, according to a fourth aspect of the present invention, for example, there is provided a broad area management method in a broad area management system which includes a broad area management apparatus and a building management apparatus provided corresponding to each of a plurality of buildings. In the broad area management method, the broad area management apparatus performs a reception step of receiving a selection of a control command of power consumption from an operation terminal of an administrator, and a control command transmission step of transmitting the control command received in the reception step to each building management apparatus provided corresponding to each building. Further, the building management apparatus performs an event program extraction step of extracting an event program corresponding to the control command with reference to an event program storage unit storing the event program in association with the control command in a case where the control command is received from the broad area management apparatus, in which the event program contains a control content to be performed on each facility in the building corresponding to the building management apparatus in order to realize the control command, and an event program execution step of controlling the power consumption of each facility by executing the extracted event program.

In addition, in the broad area management method, the building management apparatus may further perform a power information transmission step of frequently gathering power information containing the power consumption of each facility in the building corresponding to the building management apparatus, and transmitting the power information to the broad area management apparatus. The broad area management apparatus may further perform a power information reception step of receiving the power information from the building management apparatus and storing the received power information in a first power information storage unit in association with the building corresponding to the building management apparatus, and a first control command generation step of generating the control command to be transmitted in the control command transmission step by performing statistical processing on the power information stored in the first power information storage unit. In the first control command generation step, the broad area management apparatus may generate the control command by performing statistical processing on the power information stored in the first power information storage unit in a case where a first time elapses after the selection of the control command is lastly received in the reception step or after the control command is lastly generated based on the power information stored in the first power information storage unit.

In addition, in the first control command generation step of the broad area management method, the broad area management apparatus may sum up the power consumptions of the facilities in each building and further sum up the power consumptions with respect to a plurality of buildings at each timing except the last timing with reference to the power information stored in the first power information storage unit, calculate an average value by averaging the total sums in a period until a predetermined time ago, sum up the power consumptions of the facilities in each building and further sum up the power consumptions with respect to the plurality of buildings at the last timing, and generate the control command according to a difference value obtained by subtracting the average value from the calculated total sum at the last timing.

In addition, in the broad area management method, the building management apparatus may further perform a power information gathering step of frequently gathering power information containing the power consumption of each facility from the facility in the building corresponding to the building management apparatus and storing the power information in a second power information storage unit in association with the facility, and a second control command generation step of generating the control command for extracting the event program in the event program extraction step by performing statistical processing on the power information stored in the second power information storage unit. In the second control command generation step, the building management apparatus may generate the control command by performing the statistical processing on the power information stored in the second power information storage unit in a case where a second time elapses after the control command is lastly received from the broad area management apparatus or after the control command is lastly generated based on the power information stored in the second power information storage unit.

In addition, in the second control command generation step of the broad area management method, the building management apparatus may calculate an average value by averaging total sums in a period until a predetermined time ago, the total sums being the power consumptions of facilities at each timing except the last timing, with reference to the power information stored in the second power information storage unit in a period until a predetermined time ago, and generate the control command according to a difference value obtained by subtracting the average value from the total sum of the power consumptions of the facilities at the last timing.

Advantageous Effects of Invention

According to the present invention, even in a case where there are a lot of buildings of a management target, a power consumption of each building can be appropriately managed.

BRIEF DESCRIPTION OF DRAWINGS

FIG. 4 is a diagram for illustrating an exemplary data structure of a program table 250 stored in an event program storage unit 25.

FIG. 6 is a conceptual diagram for describing an exemplary control content for each building.

FIG. 11 is a diagram for illustrating an exemplary structure of data stored in a power information storage unit 26.

FIG. 12 is a conceptual diagram for describing an example of a power saving amount calculation process.

FIG. 17 is a conceptual diagram for describing another example of the control content for each building.

DESCRIPTION OF EMBODIMENTS

First, a first embodiment of the present invention will be described with reference to the drawings.

Figure 1:
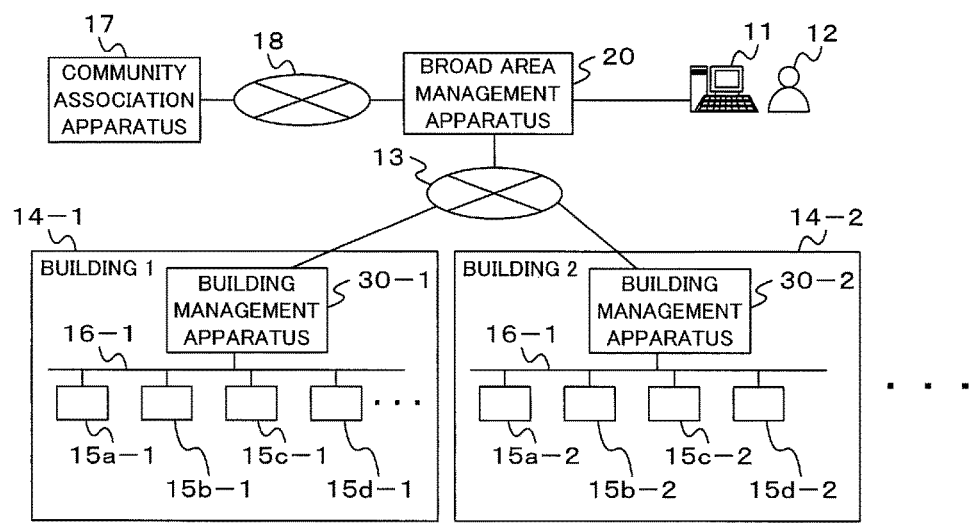
FIG. 1 is a diagram for illustrating an exemplary system configuration of a broad area management system 10 according to an embodiment of the present invention.

FIG. 1 is a diagram for illustrating an exemplary configuration of a broad area management system 10 in an embodiment of the present invention. The broad area management system 10 includes a broad area management apparatus 20 and a building management apparatus 30 which is provided in each of a plurality of buildings 14. The broad area management apparatus 20 and each building management apparatus 30 can transmit or receive communication data through a communication line 13.

The broad area management apparatus 20 receives a control command to control the power consumption of each building 14 from an administrator 12 through an operation terminal 11. Then, the broad area management apparatus 20 transmits the received control command to the building management apparatuses 30 which are provided in all the buildings 14 (the management target) through the communication line 13.

In addition, even in a case where the control command is received from another apparatus through a broad area communication line 18, the broad area management apparatus 20 can be operated in the same way as in a case where the control command is received from the administrator 12 through the operation terminal 11. As an example of "another apparatus", a community association apparatus 17 in an energy management system such as CEMS (Cluster/Community Energy Management System) for management of the entire community can be considered which transmits the control command to control the power of each building in the community.

Each building management apparatus 30 is connected to a communication network 16 such as a LAN provided in the building 14, and can transmit or receive communication data with respect to each facility 15 provided in the building 14 through the communication network 16. In addition, the building management apparatus 30 receives an event program associated to the control command from the broad area management apparatus 20 through the communication line 13 and stores the received event program therein. For example, each building management apparatus 30 may be configured by a facility used in a BEMS (Building Energy and Environmental Management System).

In this embodiment, the event program is a program for controlling the power consumption of each facility 15 by controlling the operation of the facility 15 provided in the building 14. In a case where the control command is received from the broad area management apparatus 20 through the communication line 13, each building management apparatus 30 controls a total power consumption of the building 14 according to the control command by executing the event program associated to the received control command.

Figure 2:
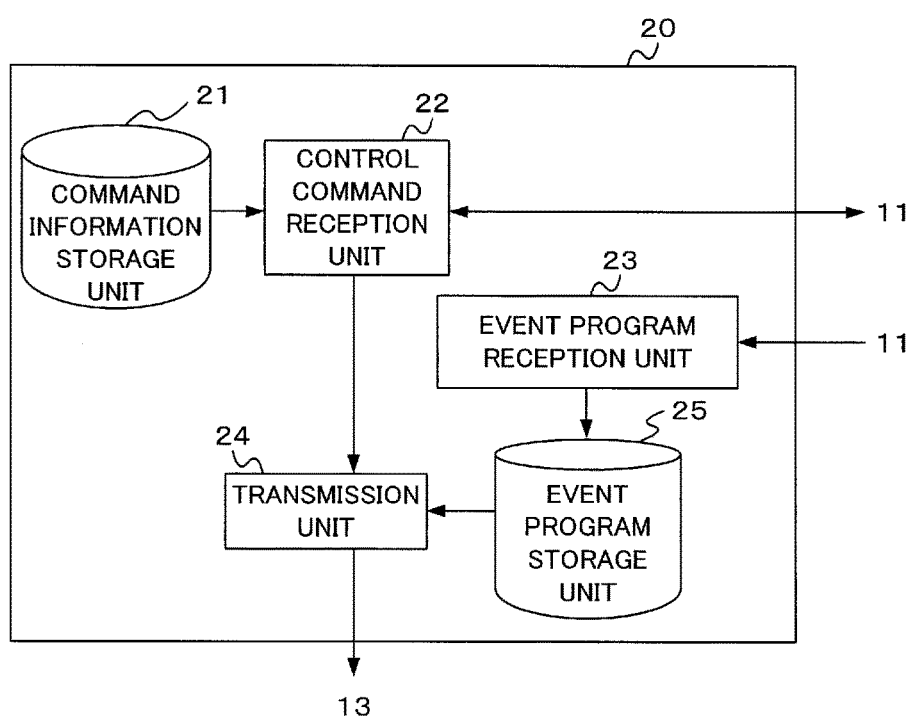
FIG. 2 is a block diagram for illustrating an exemplary functional configuration of a broad area management apparatus 20 in a first embodiment.

FIG. 2 is a block diagram for illustrating an example of a detailed functional configuration of the broad area management apparatus 20 in the first embodiment. The broad area management apparatus 20 in this embodiment includes a command information storage unit 21, a control command reception unit 22, an event program reception unit 23, a transmission unit 24, and an event program storage unit 25.

Figure 3:
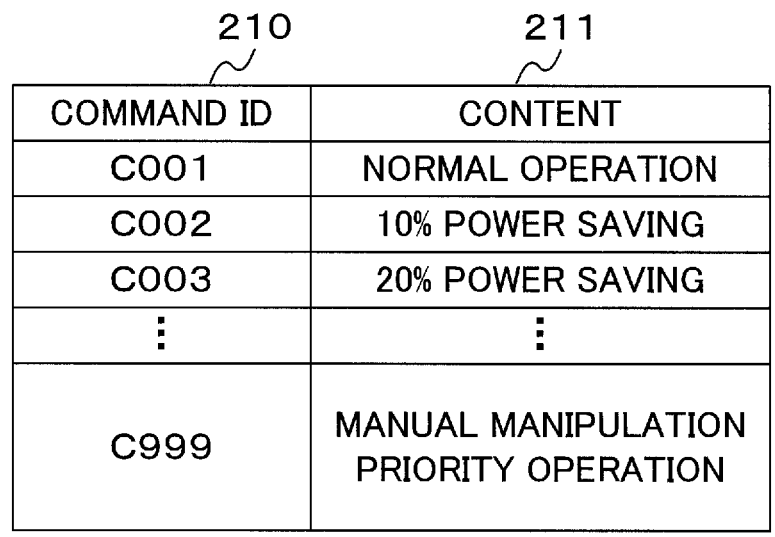
FIG. 3 is a diagram for illustrating an exemplary structure of data stored in a command information storage unit 21.

In the command information storage unit 21, for example, as illustrated in FIG. 3, information indicating a content 211 of the subject control command is stored in association with a command ID 210 for identifying each control command. "Normal operation" indicates, for example, a situation where a generally scheduled operation is performed. "x % power saving" indicates, for example, a situation where a total power consumption of all the buildings under management is lowered by x %. "Manual manipulation priority operation" indicates, for example, a situation where the normal operation is basically performed and, in the case of a manual manipulation, the control is performed according to the manipulation in priority. Information in the command information storage unit 21 can be rewritten through the operation terminal 11.

In addition, a program table 250 and a correspondence table 255 are stored in the event program storage unit 25. As illustrated in FIG. 4, in the program table 250, for example, an event program body 252 is stored in association with a program ID 251 for identifying each event program.

Figure 5:
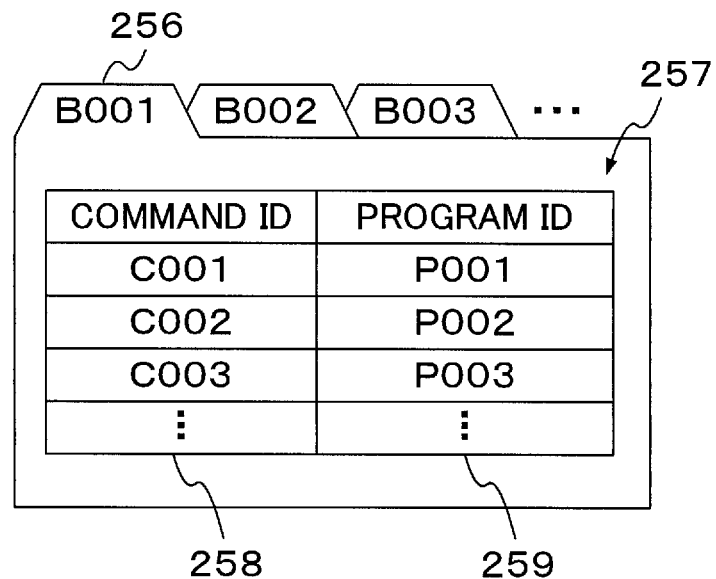
FIG. 5 is a diagram for illustrating an exemplary data structure of a correspondence table 255 stored in the event program storage unit 25.

In addition, as illustrated in FIG. 5, in the correspondence table 255, for example, the correspondence table 257 for each building is stored in association with the building ID 256. In each correspondence table 257 for each building, a program ID 259 of the event program for realizing the subject control command in the corresponding building 14 is stored for each command ID 258 for identifying each control command.

In a case where there is a request for browsing the control command from the administrator 12 through the operation terminal 11, the control command reception unit 22 reads the command ID and the content of the control command out of the command information storage unit 21, and displays the command ID and the content in a screen of the operation terminal 11. Then, in a case where a selection of the control command is received from the administrator 12 through the operation terminal 11, the control command reception unit 22 sends the command ID of the selected control command to the transmission unit 24.

In a case where the data of the program table 250 and the correspondence table 255 is received from the administrator 12 through the operation terminal 11, the event program reception unit 23 stores the received data in the event program storage unit 25.

The transmission unit 24 includes address information of the building management apparatuses 30 in all the buildings 14 of the management target in advance. In a case where the data of the program table 250 and the correspondence table 255 is registered in the event program storage unit 25, the transmission unit 24 transmits the registered data to the building management apparatuses 30 in all the buildings 14 of the management target through the communication line 13. In addition, in a case where the command ID is received from the control command reception unit 22, the transmission unit 24 transmits the received command ID to the building management apparatuses 30 in all the buildings 14 of the management target through the communication line 13.

Further, the control command and the data in the event program storage unit 25 may be transmitted to the building management apparatuses 30 in each building 14 in a unicast manner. However, since the same information is transmitted to a plurality of building management apparatuses 30, it is preferable to employ a communication method having less communication traffic such as a multicast manner.

In addition, regarding the data in the event program storage unit 25, the content of the correspondence table 257 for each building is different for every building 14, the facilities 15 in the building 14 are not frequently extended, removed, or replaced, and a frequency of updating the information in the event program storage unit 25 is not so high. For this reason, only a portion of the information in the event program storage unit 25 necessary for the subject building 14 may be transmitted to every building 14 in the unicast manner. The control command may be transmitted in the multicast manner.

In this way, the event program and the control command can be transmitted using the unicast and multicast manners. For example, the event program and the control command both are transmitted to the plurality of building management apparatuses 30 in the multicast manner. The building management apparatus 30 that receives the event program and the control command may determine whether the event program and the control command is addressed to its own apparatus, and store the event program and the control command in an event program storage unit 31 based on the determination result. The present invention is not limited to the above-described method.

The association between the control command and the content of the event program executed in every building 14 will be described with reference to FIG. 6.

As illustrated in FIG. 6, for example, in "Building 1" having a building ID of "B001", the control command "C002" of "10% power saving" is associated to an event program of "P001" for performing the control having a content such that "Illumination control" is not performed and "Change setting temperature by 2° C." is performed in "Air conditioner control". Further, "Change setting temperature by 2° C." in "Air conditioner control" means, for example, the control in which the setting temperature is increased by 2° C. when it is under air conditioning or decreased by 2° C. when it is under heating.

In addition, in "Building 1", the control command "C003" of "20% power saving" is associated to an event program of "P002" for performing the control having a content such that "Open blinder" in the vicinity of "Illumination 1" is performed in "Illumination control" and "Change setting temperature by 4° C." is performed in "Air conditioner control". Further, since "Building 1" is assumed as a building having no elevator, the control on the elevator is not performed.

In addition, in "Building 2" having a building ID of "B002", the control command "C003" of "20% power saving" is associated to an event program of "P102" for performing the control having a content such that "Open blinder" in the vicinity of both "Illumination 1" and "Illumination 2" is performed in "Illumination control", "Change setting temperature by 2° C." is performed in "Air conditioner control", and "Elevator 1" is caused to "Stop" in "Elevator control".

In this way, each building is associated to the control commands indicating different amounts of power saving, and each control command is associated to the event program for realizing control of each facility 15 to realize the subject power saving. Therefore, even when one control command is commonly transmitted from the broad area management apparatus 20 to the building management apparatus 30 in the plurality of buildings 14, each building management apparatus 30 can perform the control according to the power consumption and the control method of each facility 15 provided in the subject building 14.

Therefore, even when the broad area management apparatus 20 does not create a different control command for each building 14 and not individually transmit the control command to each building 14 whenever the power saving is necessary, a desired power saving can be realized on the plurality of buildings 14 as a whole only by commonly transmitting one control command indicating the entire power saving to all the target buildings 14.

Figure 7:
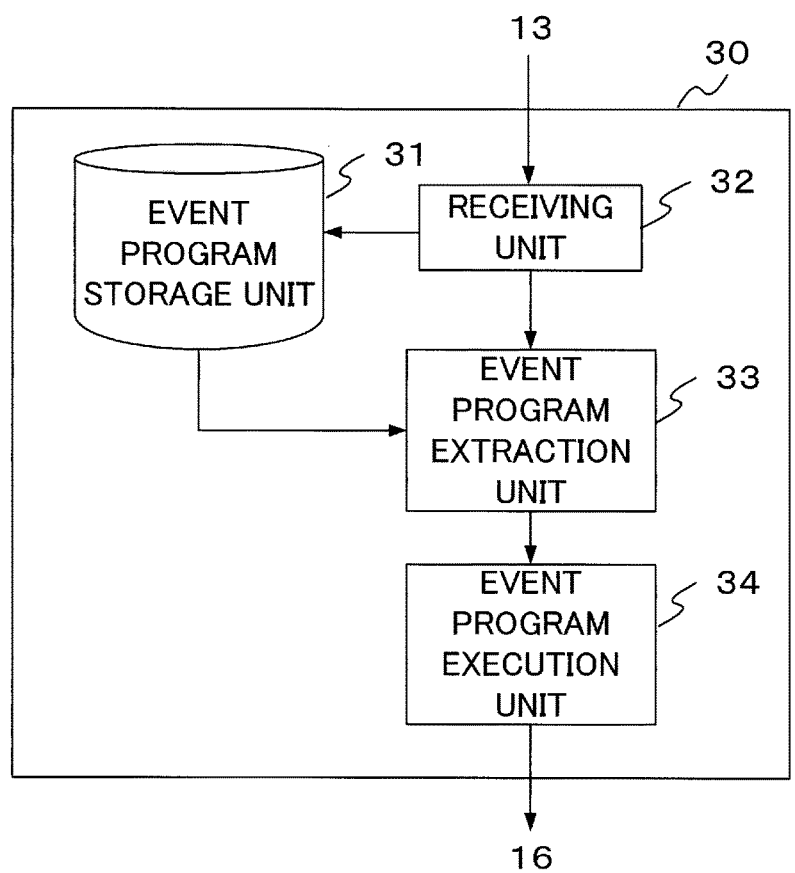
FIG. 7 is a block diagram for illustrating an exemplary functional configuration of a building management apparatus 30 in the first embodiment.

FIG. 7 is a block diagram for illustrating an exemplary functional configuration of the building management apparatus 30 in the first embodiment. The building management apparatus 30 in this embodiment includes the event program storage unit 31, a receiving unit 32, an event program extraction unit 33, and an event program execution unit 34.

The event program storage unit 31 stores, for example, the program table 250 described in FIG. 4 and the correspondence table 257 for each building illustrated in FIG. 5. Further, the program table 250 necessarily includes the data on the event program corresponding to the program ID 259 stored in the correspondence table 257 for each building. In addition, the correspondence table 257 for each building is necessarily associated to the building ID 256 of the building 14 provided with the subject building management apparatus 30, and the correspondence table 257 for each building associated to the building ID 256 of other buildings 14 is not necessary.

In a case where the program table 250 and the correspondence table 255 are received from the broad area management apparatus 20 through the communication line 13, the receiving unit 32 stores, in the event program storage unit 31, the correspondence table 257 for each building associated to the building ID 256 of the building 14 provided with the subject building management apparatus 30 in the received correspondence table 255.

In addition, the receiving unit 32 stores the event program, which is included in the received program table 250 and has the program ID stored in the correspondence table 257 for each building stored in the event program storage unit 31, in the event program storage unit 31 in association with the program ID.

In addition, in a case where the command ID of the control command is received from the broad area management apparatus 20 through the communication line 13, the receiving unit 32 sends the received command ID to the event program extraction unit 33.

In a case where the command ID is received from the receiving unit 32, the event program extraction unit 33 specifies the program ID associated to the received command ID with reference to the event program storage unit 31. Then, the event program extraction unit 33 extracts the event program associated to the specified program ID, and sends the extracted event program to the event program execution unit 34.

The event program execution unit 34 controls the operation of each facility 15 provided in the building 14 by executing the event program received from the event program extraction unit 33, so that the power consumption of each facility 15 is controlled.

Figure 8:
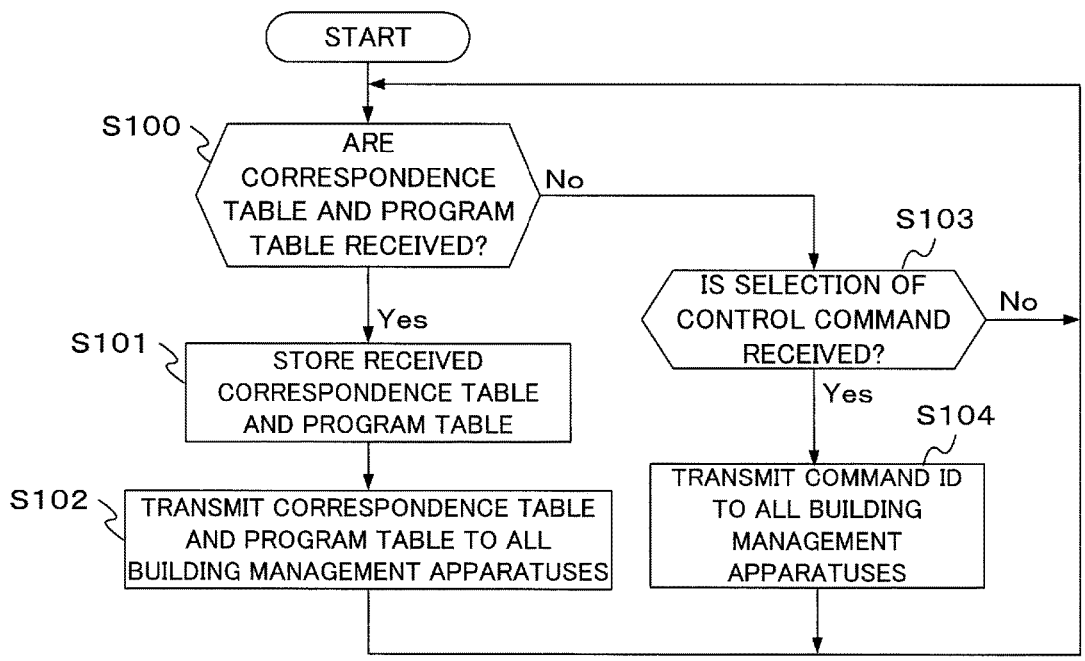
FIG. 8 is a flowchart for illustrating an exemplary operation of the broad area management apparatus 20 in the first embodiment.

FIG. 8 is a flowchart for illustrating an exemplary operation of the broad area management apparatus 20 in the first embodiment. For example, the broad area management apparatus 20 starts the operation illustrated in this flowchart by activating a program for managing the power consumption of the plurality of buildings.

First, the event program reception unit 23 determines whether the data of the program table 250 and the correspondence table 255 is received from the administrator 12 through the operation terminal 11 (S100). In a case where the data of the program table 250 and the correspondence table 255 is received (Yes in S100), the event program reception unit 23 stores the received data in the event program storage unit 25 (S101).

Next, the transmission unit 24 transmits the data of the program table 250 and the correspondence table 255 stored in the event program storage unit 25 toward the building management apparatuses 30 of all the buildings 14 of the management target through the communication line 13 (S102), and the event program reception unit 23 performs the process in step S100 again.

In a case where the data of the program table 250 and the correspondence table 255 is not received (No in S100), the control command reception unit 22 determines whether a selection of the control command is received from the administrator 12 through the operation terminal 11 (S103). In a case where the selection of the control command is not received (No in S103), the event program reception unit 23 performs the process in step S100 again.

On the other hand, in a case where the selection of the control command is received (Yes in S103), the control command reception unit 22 specifies the command ID corresponding to the selected control command with reference to the command information storage unit 21, and sends the specified command ID to the transmission unit 24. The transmission unit 24 transmits the command ID received from the control command reception unit 22 to the building management apparatuses 30 of all the buildings 14 of the management target through the communication line 13 (S104), and the event program reception unit 23 performs the process in step S100 again.

Figure 9:
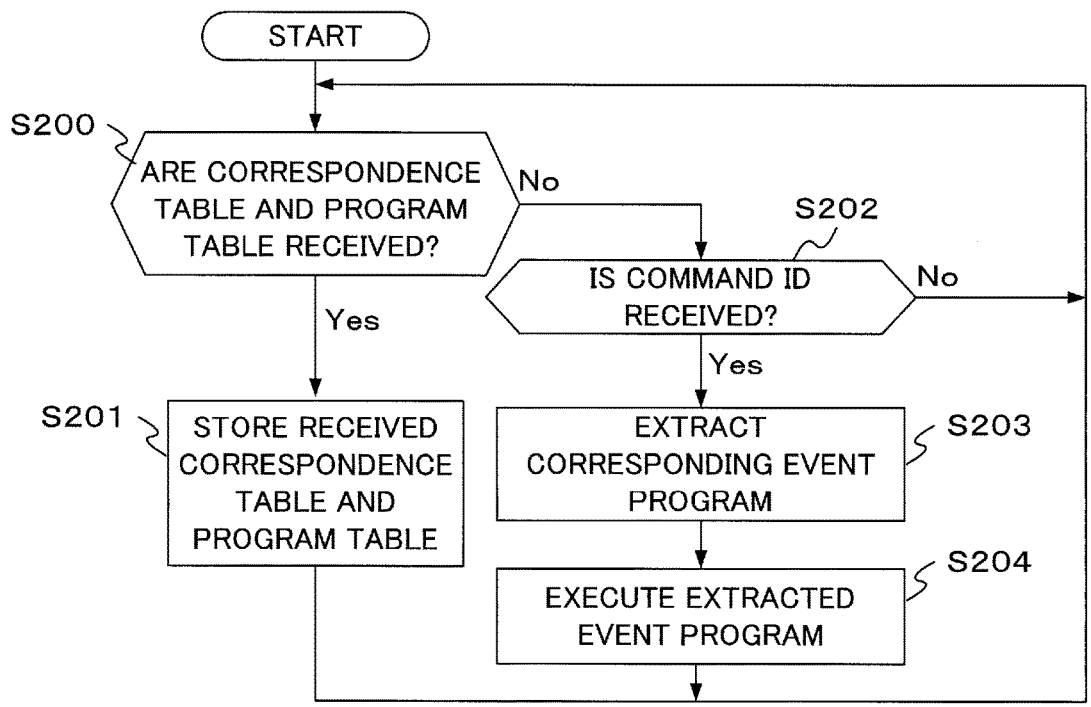
FIG. 9 is a flowchart for illustrating an exemplary operation of the building management apparatus 30 in the first embodiment.

FIG. 9 is a flowchart for illustrating an exemplary operation of the building management apparatus 30 in the first embodiment. For example, the building management apparatus 30 starts the operation illustrated in this flowchart by activating the program for managing the facility.

First, the receiving unit 32 determines whether the data of the program table 250 and the correspondence table 255 is received from the broad area management apparatus 20 through the communication line 13 (S200). In a case where the data of the program table 250 and the correspondence table 255 is received (Yes in S200), the receiving unit 32 stores, in the event program storage unit 31, the correspondence table 257 for each building associated to the building ID 256 of the building 14 provided with the subject building management apparatus 30 in the received correspondence table 255.

Then, the receiving unit 32 stores the event program, which is included in the received program table 250 and has the program ID stored in the correspondence table 257 for each building stored in the event program storage unit 31, in the event program storage unit 31 in association with the program ID (S201), and performs the process in step S200 again.

In a case where the data of the program table 250 and the correspondence table 255 is not received (No in S200), the receiving unit 32 determines whether the command ID is received from the broad area management apparatus 20 through the communication line 13 (S202). In a case where the command ID is not received (No in S202), the receiving unit 32 performs the process in step S200 again.

In a case where the command ID is received (Yes in S202), the receiving unit 32 sends the received command ID to the event program extraction unit 33. The event program extraction unit 33 specifies the program ID associated to the received command ID with reference to the event program storage unit 31 based on the command ID received from the receiving unit 32. Then, the event program extraction unit 33 extracts the event program associated to the specified program ID, and sends the extracted event program to the event program execution unit 34 (S203).

Next, the event program execution unit 34 performs the event program received from the event program extraction unit 33 (S204), and controls the operation of each facility 15 provided in the building 14, so that the power consumption of each facility 15 is controlled. Then, the receiving unit 32 performs the process in step S200 again.

Hitherto, the first embodiment of the present invention has been described.

As can be seen from the above description, according to the broad area management system 10 of this embodiment, the broad area management apparatus 20 commonly transmits one control command to the building management apparatuses 30 in the plurality of buildings 14 to control the power consumption of each building 14. Therefore, even in a case where there are a lot of buildings of the management target, there is no need to generate the control command corresponding to each of the plurality of buildings 14, so that the control command can be easily generated and the power consumption of each building can be appropriately controlled and managed.

Furthermore, according to the broad area management system 10 of this embodiment, the control command may not be individually transmitted to the plurality of buildings 14. Therefore, it is possible to reduce the size of data exchanged between the broad area management apparatus 20 and the building management apparatus 30 through the communication line 13.

Next, a second embodiment of the present invention will be described with reference to the drawings.

Figure 10:
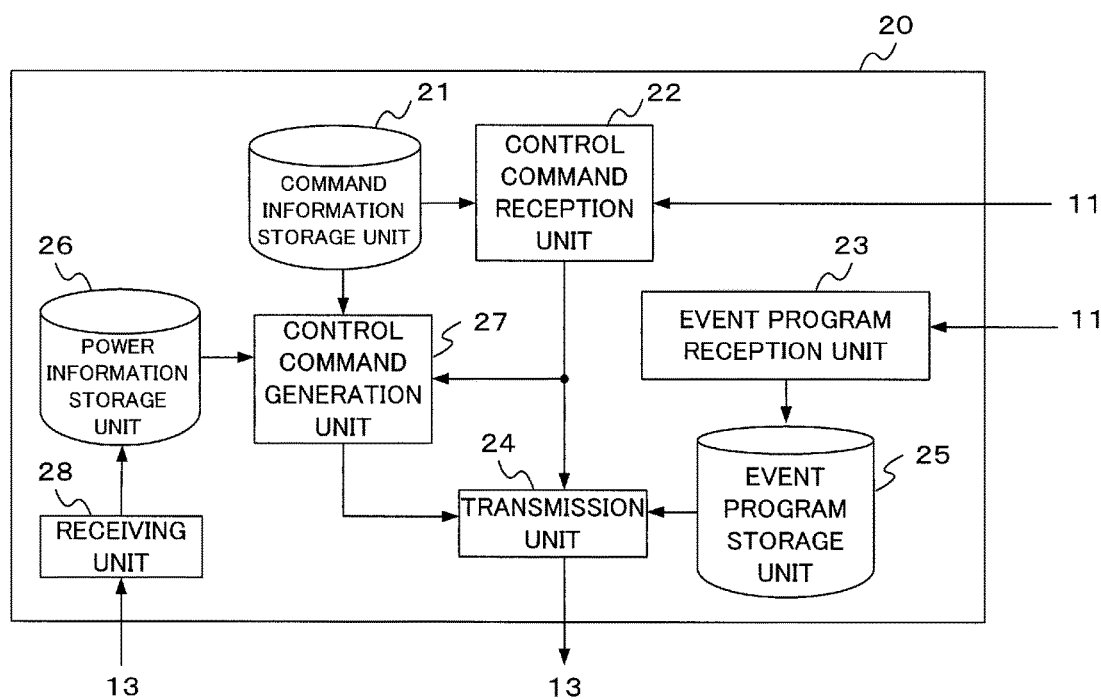
FIG. 10 is a block diagram for illustrating a functional configuration of a broad area management apparatus 20 in a second embodiment.

FIG. 10 is a block diagram for illustrating an exemplary configuration of the broad area management apparatus 20 in the second embodiment. The broad area management apparatus 20 in this embodiment includes the command information storage unit 21, the control command reception unit 22, the event program reception unit 23, the transmission unit 24, the event program storage unit 25, a power information storage unit 26, a control command generation unit 27, and a receiving unit 28. Further, except the following description, the configurations of FIG. 10 denoted with the same reference numerals as those of FIG. 2 have the functions identical with or similar to those in FIG. 2, and the detail description thereof will not be repeated.

In a case where a selection of the control command is received from the administrator 12 through the operation terminal 11, the control command reception unit 22 sends the command ID of the selected control command to the transmission unit 24 and the control command generation unit 27.

As illustrated in FIG. 11, in the power information storage unit 26, for example, a power information table 261 is stored in association with the building ID 260. In each power information table 261, a power consumption 263 in each time zone is stored in association with a date 262. The power consumption 263 shows total values of the power consumptions of the facilities 15 in the building 14 in each time zone.

In a case where the building ID and the total value of the power consumption in each time zone are received from the building management apparatus 30 through the communication line 13, the receiving unit 28 specifies the power information table 261 corresponding to the received building ID in the power information storage unit 26, and stores the received total value of the power consumption in a column corresponding to the date and the time zone in the specified power information table 261.

The control command generation unit 27 performs a power saving amount calculation process in which a total power saving amount of all the buildings 14 of the management target is calculated through statistical processing with reference to the power information storage unit 26. Then, the control command generation unit 27 specifies the control command corresponding to the calculated power saving amount with reference to the command information storage unit 21, and sends the command ID corresponding to the specified control command to the transmission unit 24. Even in a case where the command ID is received from the control command generation unit 27, the transmission unit 24 transmits the received command ID to the building management apparatuses 30 of all the buildings 14 of the management target through the communication line 13.

An example of the power saving amount calculation process will be described. FIG. 12 is a conceptual diagram for describing an example of the power saving amount calculation process. For example, in a case where the current time is 14:00 on "2013/2/11(Mon)", the control command generation unit 27 first obtains, for example, daily total power consumptions in the same time zone (for example, a time zone of 13:00-14:00) during the past one week until 1 hour ago with reference to the power information storage unit 26 as illustrated in FIG. 12. The total power consumption is a value obtained by summing up total values (each of which is a total value of the power consumptions of all the facilities 15 in each building 14 in the time zone of the date) of the power consumptions in the plurality of buildings 14.

Then, the control command generation unit 27 excludes a maximum value among the daily total power consumptions in the same time zone during the past one week from the target for calculating the average. In the example of FIG. 12, "150 kW" on "2013/2/6(Wed)" is excluded.

Next, when today is a weekday, the control command generation unit 27 excludes the total power consumptions corresponding to holidays among the daily total power consumptions in the time zone during the past one week from the target for calculating the average. Further, when today is a holiday, the control command generation unit 27 excludes the daily total power consumptions corresponding to the weekdays among the daily total power consumptions in the same time zone during the past one week.

Further, a method of excluding the total power consumption is not specifically limited to the above description, and other methods may be employed such that a maximum value and a minimum value are excluded, or the total power consumption exceeding $3\sigma$ ($\sigma$ is a standard deviation) from the average is excluded.

Next, the control command generation unit 27 calculates an average value pow_avr using the remaining power consumptions pow[0] to pow[3] as illustrated in FIG. 12. Then, the control command generation unit 27 sets the total power consumption value in 13:00-14:00 today to pow_now, and calculates a power saving amount by the following formula (1).

$$\text{Power saving amount} = (\text{pow\_now} - \text{pow\_avr})/\text{pow\_now} \qquad (1)$$

In the example of FIG. 12, the control command generation unit 27 calculates a power saving amount of 0.1. Then, the control command generation unit 27 specifies a control command most approximated to the calculated power saving amount from the command information storage unit 21 (see FIG. 3), and sends the command ID corresponding to the specified control command to the transmission unit 24. In this embodiment, the control command generation unit 27 specifies the control command of "10% power saving" for a power saving amount of "0.1" as the most approximated control command.

Further, in a case where a predetermined waiting time (for example, 1 hour) elapses after the transmission unit 24 lastly transmits the command ID corresponding to the control command selected by the administrator 12 or after the transmission unit 24 lastly transmits the command ID corresponding to the power saving amount obtained by the control command generation unit 27 in the power saving amount calculation process, the control command generation unit 27 performs the power saving amount calculation process.

Therefore, even when the administrator 12 forgets to select the command of the power saving, the broad area management apparatus 20 can control the power consumption of each building 14 within an appropriate range. Furthermore, even when the administrator 12 is unable to select the command of the power saving due to the absence on holidays, the broad area management apparatus 20 can control the power consumption of each building 14 within an appropriate range.

Further, a method of generating the control command by the control command generation unit 27 can be changed in various forms, and the present invention is not limited to the method described above.

Further, in a case where the command ID most recently received from the control command reception unit 22 is the command ID corresponding to "Manual manipulation priority operation", the control command generation unit 27 stops the power saving amount calculating process until the command ID corresponding to the control command other than "Manual manipulation priority operation" is received from the control command reception unit 22.

In this way, by using the command ID corresponding to "Manual manipulation priority operation", the operation and the setting of the facility 15 provided in the building 14 can be performed in priority over the control command from the broad area management apparatus 20. For example, when a specific air conditioner and a specific illumination apparatus are required to be operated on a holiday or night work in priority over the operation based on the control command, the command ID corresponding to "Manual manipulation priority operation" is used.

Figure 13:
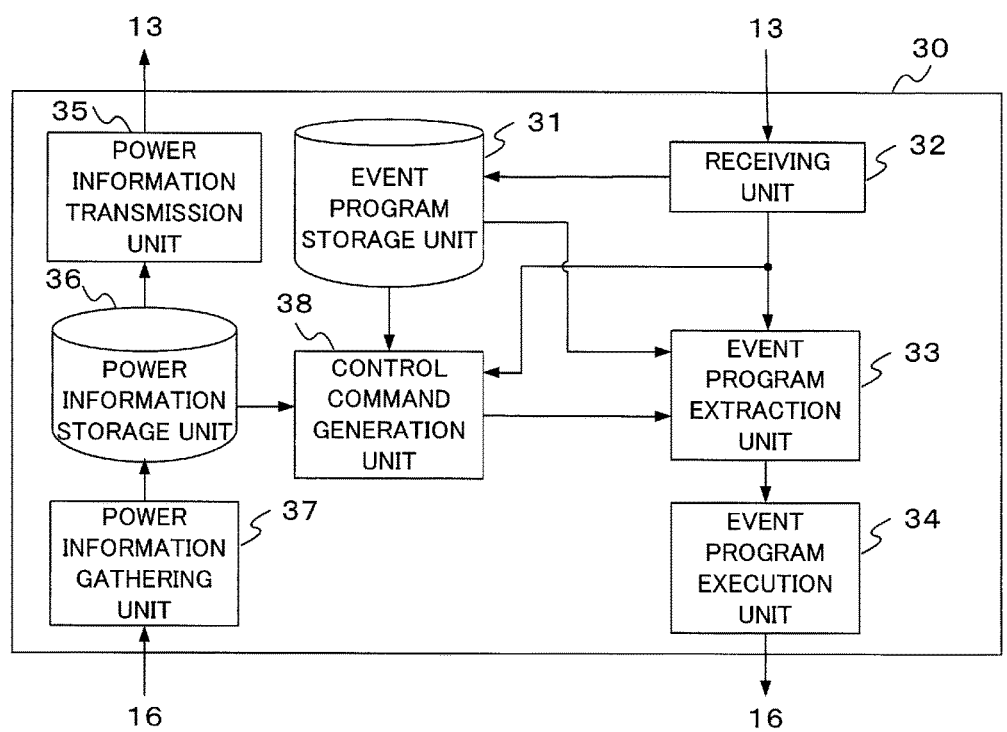
FIG. 13 is a block diagram for illustrating an exemplary functional configuration of the building management apparatus 30 in the second embodiment.

FIG. 13 is a block diagram for illustrating an exemplary functional configuration of the building management apparatus 30 in the second embodiment. The building management apparatus 30 in this embodiment includes the event program storage unit 31, the receiving unit 32, the event program extraction unit 33, the event program execution unit 34, a power information transmission unit 35, a power information storage unit 36, a power information gathering unit 37, and a control command generation unit 38. Further, except the following description, the configurations of FIG. 13 denoted with the same reference numerals as those of FIG. 7 have the functions identical with or similar to those in FIG. 7, and the detail description thereof will not be repeated.

In a case where the command ID of the control command is received from the broad area management apparatus 20 through the communication line 13, the receiving unit 32 sends the received command ID to the event program extraction unit 33 and the control command generation unit 38.

In the power information storage unit 36, for example, the power information table 261 associated to the building ID 260 of the building 14 provided with the subject building management apparatus 30 is stored as described in FIG. 11.

The power information gathering unit 37 gathers a measurement value of the power consumption of the facility 15 in the building 14 at every predetermined timing. Then, the power information gathering unit 37 adds the measurement values of the power consumptions of all the facilities 15 in every predetermined time zone, and stores the total value of the power consumption in a column of the corresponding time zone of the corresponding date in the power information storage unit 36.

Whenever the total value of the power consumption is stored in the power information storage unit 36, the power information transmission unit 35 transmits the stored total value of the power consumption together with the building ID of the building 14 provided with the subject building management apparatus 30 to the broad area management apparatus 20 through the communication line 13.

The control command generation unit 38 performs an individual power saving amount calculation process in which the power saving amount of the building 14 provided with the subject building management apparatus 30 is calculated through the statistical processing with reference to the power information storage unit 36. Then, the control command generation unit 38 sends the command ID of the control command corresponding to the calculated power saving amount to the event program extraction unit 33.

Even in a case where the command ID is received from the control command generation unit 38, the event program extraction unit 33 specifies the program ID associated to the received command ID with reference to the event program storage unit 31, extracts the event program associated to the specified program ID, and sends the extracted event program to the event program execution unit 34.

Further, the individual power saving amount calculation process performed by the control command generation unit 38 is the same as the power saving amount calculation process performed by the control command generation unit 27 of the broad area management apparatus 20, but is different in that the power consumption of the average calculation target is a total sum of the power consumptions of the building 14 provided with the subject building management apparatus 30.

In other words, the control command generation unit 38 excludes a maximum value from the average calculation target among the daily power consumptions in the building 14 in the same time zone during the past one week in the same time zone until 1 hour ago from the current time.

Next, when today is a weekday, the control command generation unit 38 excludes the power consumptions corresponding to holidays from the average calculation target among the daily power consumptions in the building 14 in the time zone during the past one week. Then, the control command generation unit 38 calculates an average value of the remaining power consumptions as pow_avr.

Then, the control command generation unit 38 sets the power consumption value in the same time zone today to pow_now, and calculates the power saving amount by the formula (1) above. Then, the control command generation unit 38 specifies a control command most approximated to the calculated power saving amount from the event program storage unit 31, and sends the command ID corresponding to the specified control command to the event program extraction unit 33.

Further, in a case where a predetermined waiting time (for example, 1 hour) elapses after the control command generation unit 38 lastly performs the event program corresponding to the command ID received from the broad area management apparatus 20 or after the event program corresponding to the command ID corresponding to the power saving amount obtained by the control command generation unit 38 in the individual power saving amount calculation process is lastly performed, the control command generation unit 38 performs an individual power amount calculation process.

Therefore, even when a failure occurs in the broad area management apparatus 20 or the communication line 13, the building management apparatus 30 can control the entire power consumption of the building 14 within an appropriate range. Further, the waiting time until the individual power saving amount calculation process is performed by the control command generation unit 38 is preferably equal to or longer than the waiting time until the power saving amount calculation process is performed by the control command generation unit 27 of the broad area management apparatus 20. Therefore, in a situation where there is no failure in the broad area management apparatus 20 and the communication line 13, the power consumption of the facility 15 in each building 14 can be controlled and managed by the broad area management apparatus 20.

Further, in a case where the command ID most recently received from the receiving unit 32 is the command ID corresponding to "Manual manipulation priority operation", the control command generation unit 38 stops the individual power saving amount calculation process until the command ID corresponding to the control command other than "Manual manipulation priority operation" is received from the receiving unit 32.

Figure 14:
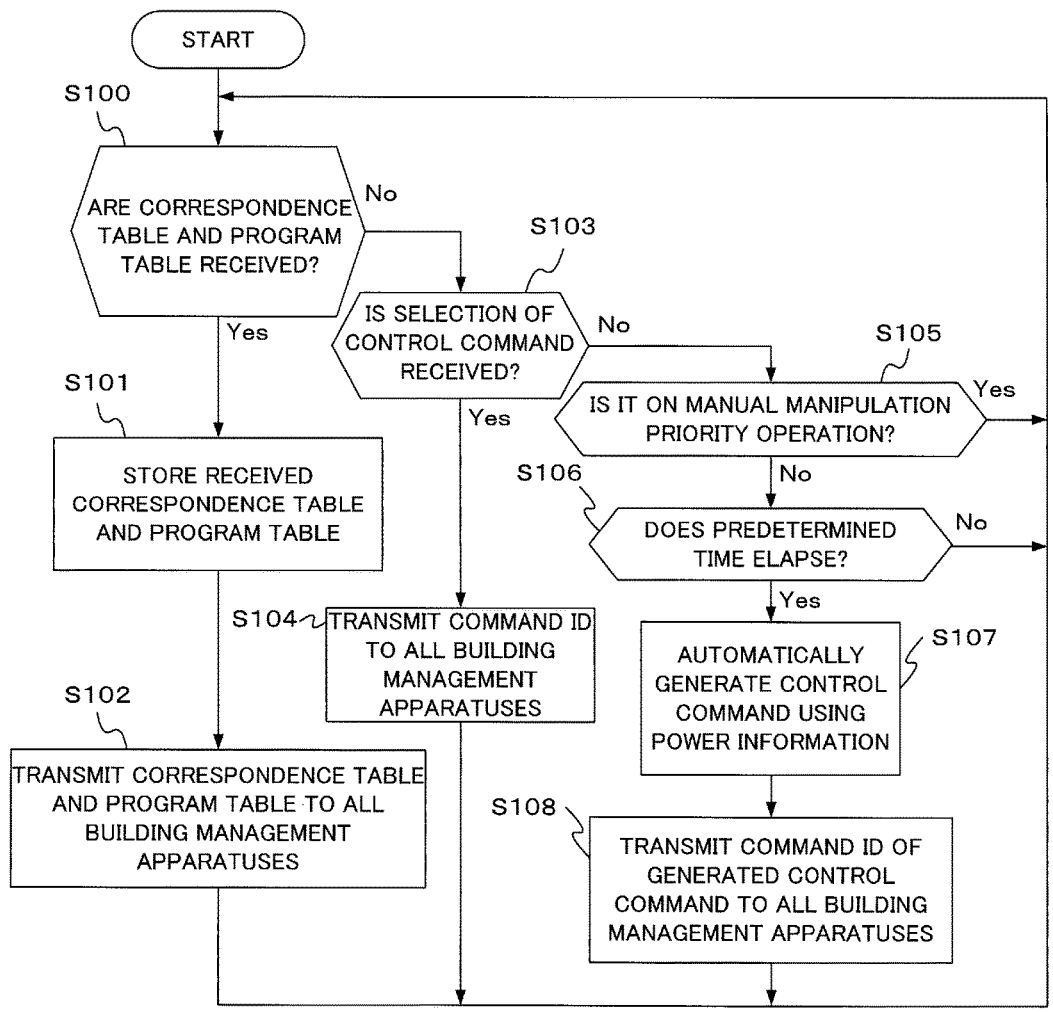
FIG. 14 is a flowchart for illustrating an exemplary operation of the broad area management apparatus 20 in the second embodiment.

FIG. 14 is a flowchart for illustrating an exemplary operation of the broad area management apparatus 20 in the second embodiment. Further, except the following description, the processes of FIG. 14 denoted with the same reference numerals as those of FIG. 8 have the processes identical with or similar to those in FIG. 8, and the detail description thereof will not be repeated.

In step S103, in a case where a selection of the control command is not received (No in S103), the control command generation unit 27 determines whether the most recently transmitted command ID is the command ID corresponding to "Manual manipulation priority operation" so as to determine whether it is on the manual manipulation priority operation (S105). In a case where the lastly transmitted command ID is the command ID corresponding to "Manual manipulation priority operation", that is, in a case where it is on the manual manipulation priority operation (Yes in S105), the event program reception unit 23 performs the process of step S100 again.

On the other hand, in a case where the most recently transmitted command ID is not the command ID corresponding to "Manual manipulation priority operation", that is, in a case where it is not on the manual manipulation priority operation (No in S105), the control command generation unit 27 determines whether a predetermined waiting time elapses after the process of step S104 is lastly performed or after the process of step S108 (described below) is lastly performed (S106). In a case where the predetermined waiting time does not elapse (No in S106), the event program reception unit 23 performs the process of step S100 again.

On the other hand, in a case where the predetermined waiting time elapses (Yes in S106), the control command generation unit 27 performs the power saving amount calculation process in which the total power saving amount of all the buildings 14 of the management target is calculated with reference to the power information storage unit 26. Then, the control command generation unit 27 specifies the control command corresponding to the calculated power saving amount with reference to the command information storage unit 21, and sends the command ID corresponding to the specified control command to the transmission unit 24 (S107).

Next, the transmission unit 24 transmits the command ID received from the control command generation unit 27 to the building management apparatuses 30 of all the buildings 14 of the management target through the communication line 13 (S108), and the event program reception unit 23 performs the process of step S100 again.

Figure 15:
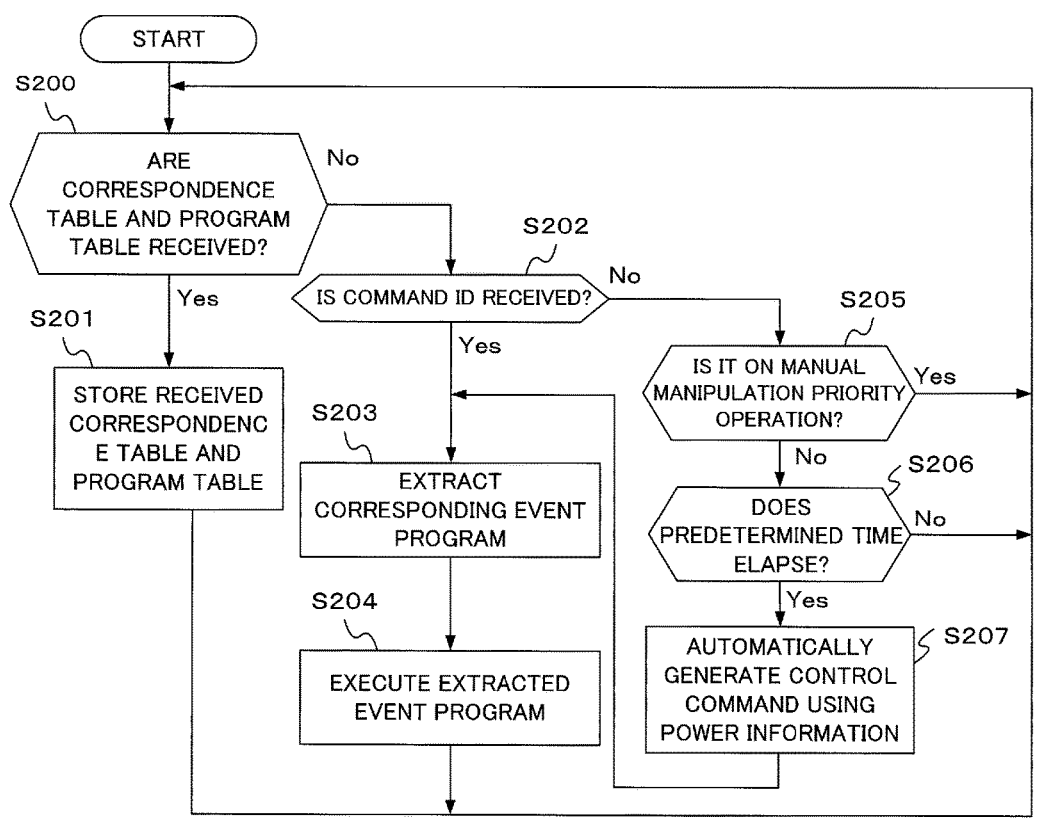
FIG. 15 is a flowchart for illustrating an exemplary operation of the building management apparatus 30 in the second embodiment.

FIG. 15 is a flowchart for illustrating an exemplary operation of the building management apparatus 30 in the second embodiment. Further, except the following description, the processes of FIG. 15 denoted with the same reference numerals as those of FIG. 9 have the processes identical with or similar to those in FIG. 9, and the detail description thereof will not be repeated.

In step S202, in a case where the command ID is not received (No in S202), the control command generation unit 38 determines whether the most recently received command ID is the command ID corresponding to "Manual manipulation priority operation" so as to determine whether it is on the manual manipulation priority operation (S205). In a case where the lastly received command ID is the command ID corresponding to "Manual manipulation priority operation", that is, in a case where it is on the manual manipulation priority operation (Yes in S205), the receiving unit 32 performs the process of step S200 again.

On the other hand, in a case where the most recently received command ID is not the command ID corresponding to "Manual manipulation priority operation", that is, in a case where it is not on the manual manipulation priority operation (No in S205), the control command generation unit 38 determines whether a predetermined waiting time elapses after the process of Step S204 is lastly performed or after the process of step S207 (described below) is lastly performed (S206). In a case where the predetermined waiting time does not elapse (No in S206), the receiving unit 32 performs the process of step S200 again.

On the other hand, in a case where the predetermined waiting time elapses (Yes in S206), the control command generation unit 38 performs the individual power saving amount calculation process in which the power saving amount of the building 14 provided with the subject building management apparatus 30 with reference to the power information storage unit 36. Then, the control command generation unit 38 specifies the command ID of the control command corresponding to the calculated power saving amount. Then, the control command generation unit 38 sends the specified command ID to the event program extraction unit 33 (S207), and the event program extraction unit 33 performs the process of step S203.

Hitherto, the second embodiment of the present invention has been described.

Figure 16:
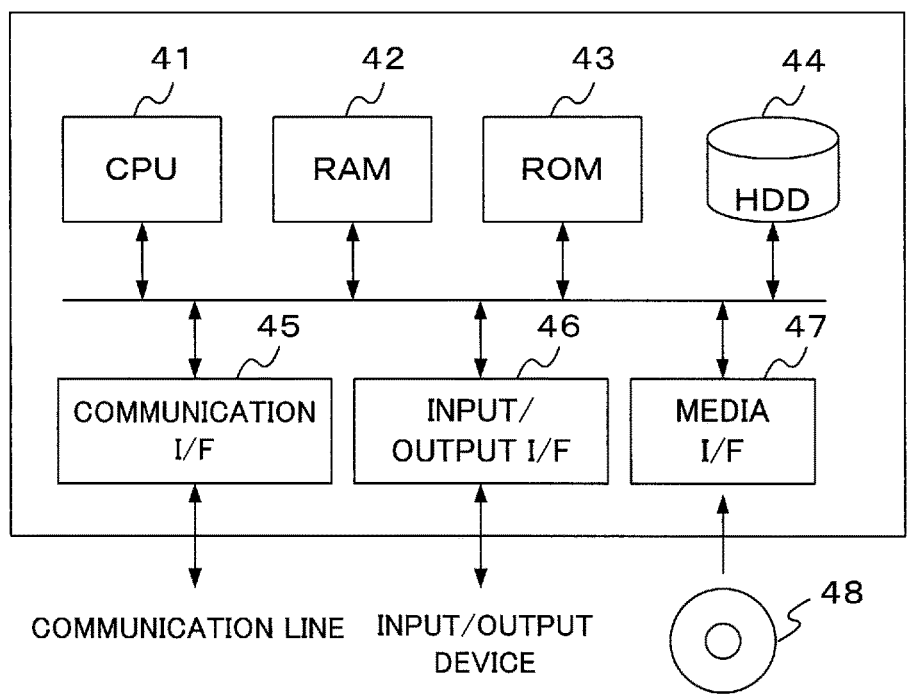
FIG. 16 is a diagram for illustrating an exemplary hardware configuration of a computer 40 that implements a function of the broad area management apparatus 20 or the building management apparatus 30.

Further, the broad area management apparatus 20 or the building management apparatus 30 in the first or second embodiment is implemented by, for example, a computer 40 having the configuration illustrated in FIG. 16.

FIG. 16 is a diagram for illustrating an exemplary hardware configuration of the computer 40 that implements a function of the broad area management apparatus 20 or the building management apparatus 30. The computer 40 includes a CPU (Central Processing Unit) 41, RAM (Random Access Memory) 42, ROM (Read Only Memory) 43, an HDD (Hard Disk Drive) 44, a communication interface (I/F) 45, an input/output interface (I/F) 46, and a media interface (I/F) 47.

The CPU 41 operates based on a program stored in the ROM 43 or the HDD 44, and controls the respective parts. The ROM 43 stores a boot program executed by the CPU 41 at the time of activating the computer 40 and a program depending on hardware of the computer 40.

The HDD 44 stores the program executed by the CPU 41 and data used by the subject program. The communication interface 45 receives the data from other devices through the communication line and sends the data to the CPU 41, and transmits the data generated by the CPU 41 to the other devices through the communication line.

The CPU 41 controls an output device such as a display and an input device such as a mouse or a keyboard through the input/output interface 46. The CPU 41 acquires a signal from the input device through the input/output interface 46. In addition, the CPU 41 outputs the generated signal to the output device through the input/output interface 46.

The media interface 47 reads the program or the data stored in a recording medium 48, and supplies the program or the data to the CPU 41 through the RAM 42. The CPU 41 loads the subject program onto the RAM 42 from the recording medium 48 through the media interface 47, and executes the loaded program. Examples of the recording medium 48 include an optical recording medium such as a DVD (Digital Versatile Disk) or a PD (Phase change rewritable Disk), a magneto-optical recording medium such as a MO (Magneto-Optical disk), a tape medium, a magneto recording medium, or a semiconductor memory.

In a case where the computer 40 serves as the broad area management apparatus 20 in the first embodiment, the CPU 41 of the computer 40 executes the program loaded onto the RAM 42 to implement the respective functions of the command information storage unit 21, the control command reception unit 22, the event program reception unit 23, the transmission unit 24, and the event program storage unit 25. In addition, the data in the command information storage unit 21 or the event program storage unit 25 may be stored in the ROM 43 or the HDD 44, or may be stored in a database on a network.

In addition, in a case where the computer 40 serves as the building management apparatus 30 in the first embodiment, the CPU 41 of the computer 40 executes the program loaded onto the RAM 42 to implement the respective functions of the event program storage unit 31, the receiving unit 32, the event program extraction unit 33, and the event program execution unit 34. In addition, the data in the event program storage unit 31 may be stored in the ROM 43 or the HDD 44, or may be stored in a database on a network.

In addition, in a case where the computer 40 serves as the broad area management apparatus 20 in the second embodiment, the CPU 41 of the computer 40 executes the program loaded onto the RAM 42 to implement the respective functions of the command information storage unit 21, the control command reception unit 22, the event program reception unit 23, the transmission unit 24, the event program storage unit 25, the power information storage unit 26, the control command generation unit 27, and the receiving unit 28. In addition, the data in the command information storage unit 21, the event program storage unit 25, or the power information storage unit 26 may be stored in the ROM 43 or the HDD 44, or may be stored in a database on a network.

In addition, in a case where the computer 40 serves as the building management apparatus 30 in the second embodiment, the CPU 41 of the computer 40 executes the program loaded onto the RAM 42 to implement the respective functions of the event program storage unit 31, the receiving unit 32, the event program extraction unit 33, the event program execution unit 34, the power information transmission unit 35, the power information storage unit 36, the power information gathering unit 37, and the control command generation unit 38. In addition, the data in the event program storage unit 31 or the power information storage unit 36 may be stored in the ROM 43 or the HDD 44, or may be stored in a database on a network.

The CPU 41 of the computer 40 reads these programs from the recording medium 48 and executes the programs, and as another example, these programs may be acquired from another device through the communication line. Further, the HDD 44 may not be provided in the broad area management apparatus 20 or the building management apparatus 30, and the program and the data may be stored in the rewritable ROM 43.

In addition, the present invention is not limited to the above embodiments, and various changes can be made within a scope of the spirit of the present invention.

For example, in the second embodiment, the control command generation unit 27 and the control command generation unit 38 have been described to be provided in the broad area management apparatus 20 and the building management apparatus 30, respectively. However, the present invention is not limited to the above configuration, and the control command generation unit may be provided in any one of the broad area management apparatus 20 and the building management apparatus 30.

Even in such a configuration, in a case where the power information storage unit 26, the control command generation unit 27, and the receiving unit 28 are provided in the broad area management apparatus 20, even when the administrator 12 forgets to select the command for the power saving, the effect that the broad area management apparatus 20 can control the power consumption of each building 14 within an appropriate range is obtained. In a case where the power information transmission unit 35, the power information storage unit 36, the power information gathering unit 37, and the control command generation unit 38 are provided in the building management apparatus 30, even when a failure occurs in the broad area management apparatus 20 or the communication line 13, the effect that the building management apparatus 30 can control the total power consumption of the building 14 within an appropriate range is obtained.

In addition, in the control command of the embodiments, one power saving amount is associated to one command ID, but the present invention is not limited thereto. For example, as illustrated in FIG. 17, the control command of "10% power saving" is assigned with different command IDs, and each command ID may be associated to the event programs perform different power saving control on each building.

With this configuration, even when the control commands have the same amount of power saving such as "10% power saving", the reducing power amount can be changed for each building or each facility in the building. Therefore, the reducing power saving amount is suppressed to 13% in "Building 1" where an event is open at present, and instead the reducing power saving amount is increased to 10% in "Building 2" where there are few people, so that "10% power saving" as a whole is realized. Therefore, the distribution of the reducing power saving amount can be flexibly changed for every predetermined period. Furthermore, the power saving control can be differently performed on the respective buildings, for example, according to seasons, weekdays, or holidays.

Further, the respective components in the broad area management apparatus 20 and the building management apparatus 30 are distinguished by functions according to the content of main processing for the sake of easy understanding on the configurations of the broad area management apparatus 20 and the building management apparatus 30 according to this embodiment. Therefore, the present invention is not limited by the distinguishing method of the components or the names. The configurations of the broad area management apparatus 20 and the building management apparatus 30 according to this embodiment may be distinguished into more components according to the content of processing, or one component may be distinguished into many parts to perform more processing. In addition, each processing may be realized by software, or may be realized by a dedicated hardware component such as an ASIC (Application Specific Integrated Circuit).

REFERENCE SIGNS LIST

10: broad area management system
11: operation terminal
12: administrator
13: communication line
14: building
15: facility
16: communication network
17: community association apparatus
18: broad area communication line
20: broad area management apparatus
21: command information storage unit
22: control command reception unit
23: event program reception unit
24: transmission unit
25: event program storage unit
250: program table
255: correspondence table
26: power information storage unit
27: control command generation unit
28: receiving unit
30: building management apparatus
31: event program storage unit
32: receiving unit
33: event program extraction unit
34: event program execution unit
35: power information transmission unit
36: power information storage unit
37: power information gathering unit
38: control command generation unit
40: computer
41: CPU
42: RAM
43: ROM
44: HDD
45: communication interface
46: input/output interface
47: media interface
48: recording medium

The invention claimed is:

1. A broad area management system which manages power consumed in a plurality of buildings, comprising:
a broad area management apparatus; and
a building management apparatus configured to be provided according to each building,
wherein the broad area management apparatus includes
a reception unit configured to receive a selection of a control command of power consumption from an operation terminal of an administrator, and
a control command transmission unit configured to transmit the control command received by the reception unit to each of a plurality of the building management apparatuses, and
wherein the building management apparatus includes
an event program storage unit configured to store an event program in association with the control command, the event program containing a control content to be performed on each facility in the building corresponding to the building management apparatus in order to realize the control command,
an event program extraction unit configured to extract the event program corresponding to the control command from the event program storage unit in a case where the control command is received from the broad area management apparatus, and
an event program execution unit configured to control power consumption of each facility by performing the extracted event program, and
wherein the building management apparatus further includes a power information transmission unit configured to frequently gather power information containing the power consumption of each facility in the building corresponding to the building management apparatus and transmit the power information to the broad area management apparatus,
wherein the broad area management apparatus further includes
a first power information storage unit configured to store the power information of each facility in the building in association with each building,
a power information receiving unit configured to receive the power information from the building management apparatus and to store the power information in the first power information storage unit, and
a first control command generation unit configured to generate the control command by performing statistical processing on the power information stored in the first power information storage unit and cause the control command transmission unit to transmit the generated control command, and
wherein the first control command generation unit generates the control command based on the power information stored in the first power information storage unit in a case where a first time elapses after the reception unit lastly receives the selection of the control command or after the control command is lastly generated based on the power information stored in the first power information storage unit.

2. The broad area management system according to claim 1,
wherein the first control command generation unit sums up the power consumptions of the facilities in each building and further sums up the power consumptions with respect to a plurality of buildings at each timing except the last timing with reference to the power information stored in the first power information storage unit, calculates an average value by averaging the total sums in a period until a predetermined time ago, sums up the power consumptions of the facilities in each building and further sums up the power consumptions with respect to the plurality of buildings at the last timing, and generates the control command according to a difference value obtained by subtracting the average value from the calculated total sum at the last timing.

3. A broad area management system which manages power consumed in a plurality of buildings, comprising:
a broad area management apparatus; and
a building management apparatus configured to be provided according to each building,
wherein the broad area management apparatus includes
a reception unit configured to receive a selection of a control command of power consumption from an operation terminal of an administrator, and
a control command transmission unit configured to transmit the control command received by the reception unit to each of a plurality of the building management apparatuses, and
wherein the building management apparatus includes
an event program storage unit configured to store an event program in association with the control command, the event program containing a control content to be performed on each facility in the building corresponding to the building management apparatus in order to realize the control command,
an event program extraction unit configured to extract the event program corresponding to the control command from the event program storage unit in a case where the control command is received from the broad area management apparatus, and
an event program execution unit configured to control power consumption of each facility by performing the extracted event program, and
wherein the building management apparatus further includes
a second power information storage unit configured to store power information containing the power consumption of each facility in association with the subject facility in the building corresponding to the building management apparatus,
a power information gathering unit configured to frequently gather the power information from each facility in the building corresponding to the building management apparatus and store the power information in the second power information storage unit, and
a second control command generation unit configured to generate the control command by performing statistical processing on the power information stored in the second power information storage unit and cause the event program extraction unit to extract the corresponding event program, and
wherein the second control command generation unit generates the control command by performing the statistical processing on the power information stored in the second power information storage unit in a case where a second time elapses after the control command is lastly received from the broad area management apparatus or after the control command is lastly generated based on the power information stored in the second power information storage unit.

4. The broad area management system according to claim 3,
wherein the second control command generation unit calculates an average value by averaging total sums in a period until a predetermined time ago, the total sums being the power consumptions of facilities at each timing except the last timing, with reference to the power information stored in the second power information storage unit, and generates the control command according to a difference value obtained by subtracting the average value from the total sum of the power consumptions of the facilities at the last timing.

5. A broad area management apparatus which manages power consumed in a plurality of buildings, comprising:
a reception unit configured to receive a selection of a control command of power consumption from an operation terminal of an administrator;
a control command transmission unit configured to transmit the control command received by the reception unit to each of a plurality of building management apparatuses which controls an operation of a facility in each building;
a first power information storage unit configured to store a power information of each facility in the building in association with each building;
a power information receiving unit configured to receive the power information from the building management apparatus and to store the power information in the first power information storage unit; and
a first control command generation unit configured to generate the control command by performing statistical processing on the power information stored in the first power information storage unit and cause the control command transmission unit to transmit the generated control command, and
wherein the first control command generation unit generates the control command based on the power information stored in the first power information storage unit in a case where a first time elapses after the reception unit lastly receives the selection of the control command or after the control command is lastly generated based on the power information stored in the first power information storage unit.

6. A building management apparatus which controls power consumed in a building, comprising:
an event program storage unit configured to store an event program in association with a control command indicating a reduction of power consumption, the event program containing a control content to be performed on each facility in the building corresponding to the building management apparatus in order to realize the control command;
an event program extraction unit configured to extract the event program corresponding to the control command from the event program storage unit in a case where the control command is received from a broad area management apparatus which transmits the same control command to a plurality of the building management apparatuses;

an event program execution unit configured to control power consumption of each facility by performing the extracted event program;

a second power information storage unit configured to store power information containing the power consumption of each facility in association with the subject facility in the building corresponding to the building management apparatus;

a power information gathering unit configured to frequently gather the power information from each facility in the building corresponding to the building management apparatus and store the power information in the second power information storage unit; and a second control command generation unit configured to generate the control command by performing statistical processing on the power information stored in the second power information storage unit and cause the event program extraction unit to extract the corresponding event program, and wherein the second control command generation unit generates the control command by performing the statistical processing on the power information stored in the second power information storage unit in a case where a second time elapses after the control command is lastly received from the broad area management apparatus or after the control command is lastly generated based on the power information stored in the second power information storage unit.

7. A broad area management method in a broad area management system which includes a broad area management apparatus and a building management apparatus provided corresponding to each of a plurality of buildings, comprising:

performing, by the broad area management apparatus,
a reception step of receiving a selection of a control command of power consumption from an operation terminal of an administrator, and
a control command transmission step of transmitting the control command received in the reception step to each building management apparatus provided corresponding to each building, and performing, by the building management apparatus,
an event program extraction step of extracting an event program corresponding to the control command with reference to an event program storage unit storing the event program in association with the control command in a case where the control command is received from the broad area management apparatus, the event program containing a control content to be performed on each facility in the building corresponding to the building management apparatus in order to realize the control command; and
an event program execution step of controlling the power consumption of each facility by executing the extracted event program, and wherein the building management apparatus further performs a power information transmission step of frequently gathering power information containing the power consumption of each facility in the building corresponding to the building management apparatus, and transmitting the power information to the broad area management apparatus, wherein the broad area management apparatus further performs
a power information reception step of receiving the power information from the building management apparatus and storing the received power information in a first power information storage unit in association with the building corresponding to the building management apparatus, and
a first control command generation step of generating the control command to be transmitted in the control command transmission step by performing statistical processing on the power information stored in the first power information storage unit, and wherein, in the first control command generation step, the broad area management apparatus generates the control command by performing statistical processing on the power information stored in the first power information storage unit in a case where a first time elapses after the selection of the control command is lastly received in the reception step or after the control command is lastly generated based on the power information stored in the first power information storage unit.

8. The broad area management method according to claim 7,
wherein, in the first control command generation step, the broad area management apparatus sums up the power consumptions of the facilities in each building and further sums up the power consumptions with respect to a plurality of buildings at each timing except the last timing with reference to the power information stored in the first power information storage unit, calculates an average value by averaging the total sums in a period until a predetermined time ago, sums up the power consumptions of the facilities in each building and further sums up the power consumptions with respect to the plurality of buildings at the last timing, and generates the control command according to a difference value obtained by subtracting the average value from the calculated total sum at the last timing.

9. A broad area management method in a broad area management system which includes a broad area management apparatus and a building management apparatus provided corresponding to each of a plurality of buildings, comprising:

performing, by the broad area management apparatus,
a reception step of receiving a selection of a control command of power consumption from an operation terminal of an administrator, and
a control command transmission step of transmitting the control command received in the reception step to each building management apparatus provided corresponding to each building, and performing, by the building management apparatus,
an event program extraction step of extracting an event program corresponding to the control command with reference to an event program storage unit storing the event program in association with the control command in a case where the control command is received from the broad area management apparatus, the event program containing a control content to be performed on each facility in the building corresponding to the building management apparatus in order to realize the control command; and
an event program execution step of controlling the power consumption of each facility by executing the extracted event program, and wherein the building management apparatus further performs
a power information gathering step of frequently gathering power information containing the power consumption of each facility from the facility in the building corresponding to the building management apparatus and storing the power information in a second power information storage unit in association with the facility, and a second control command generation step of generating the control command for extracting the event program in the event program extraction step by performing statistical processing on the power information stored in the second power information storage unit, and wherein, in the second control command generation step, the building management apparatus generates the control command by performing the statistical processing on the power information stored in the second power information storage unit in a case where a second time elapses after the control command is lastly received from the broad area management apparatus or after the control command is lastly generated based on the power information stored in the second power information storage unit.

10. The broad area management method according to claim 9, wherein, in the second control command generation step, the building management apparatus calculates an average value by averaging total sums in a period until a predetermined time ago, the total sums being the power consumptions of facilities at each timing except the last timing, with reference to the power information stored in the second power information storage unit, and generates the control command according to a difference value obtained by subtracting the average value from the total sum of the power consumptions of the facilities at the last timing.

11. A broad area management method in a broad area management apparatus which manages power consumed in a plurality of buildings, comprising:

performing, by the broad area management apparatus, a reception step of receiving a selection of a control command of power consumption from an operation terminal of an administrator, a control command transmission step of transmitting the control command received in the reception step to each of a plurality of building management apparatuses which controls an operation of a facility in each building, a power information reception step of receiving the power information from the building management apparatus and storing the received power information in a first power information storage unit in association with the building corresponding to the building management apparatus, and a first control command generation step of generating the control command to be transmitted in the control command transmission step by performing statistical processing on the power information stored in the first power information storage unit, and wherein, in the first control command generation step, the broad area management apparatus generates the control command by performing statistical processing on the power information stored in the first power information storage unit in a case where a first time elapses after the selection of the control command is lastly received in the reception step or after the control command is lastly generated based on the power information stored in the first power information storage unit.

12. A broad area management method in a building management apparatus which controls power consumed in a building, comprising:

performing, by the building management apparatus, an event program extraction step of extracting an event program corresponding to a control command with reference to an event program storage unit storing the event program in association with the control command in a case where the control command is received from a broad area management apparatus which transmits the control command to a plurality of the building management apparatuses, the event program containing a control content to be performed on each facility in the building corresponding to the building management apparatus in order to realize the control command; and an event program execution step of controlling the power consumption of each facility by executing the extracted event program;

a power information gathering step of frequently gathering power information containing the power consumption of each facility from the facility in the building corresponding to the building management apparatus and storing the power information in a second power information storage unit in association with the facility; and a second control command generation step of generating the control command for extracting the event program in the event program extraction step by performing statistical processing on the power information stored in the second power information storage unit, and wherein, in the second control command generation step, the building management apparatus generates the control command by performing the statistical processing on the power information stored in the second power information storage unit in a case where a second time elapses after the control command is lastly received from the broad area management apparatus or after the control command is lastly generated based on the power information stored in the second power information storage unit.

* * * * *